April 1, 1952 L. M. KEEF 2,591,552
LATHE ATTACHMENT
Filed Oct. 25, 1948 2 SHEETS—SHEET 1

Leard M. Keef
INVENTOR.

BY *Clarence A. O'Brien
and Harvey B. Jackson*
Attorneys

Leard M. Keef
INVENTOR.

Patented Apr. 1, 1952

2,591,552

UNITED STATES PATENT OFFICE 2,591,552

LATHE ATTACHMENT

Leard M. Keef, De Land, Fla., assignor to Paul J. Stine, Orlando, Fla.

Application October 25, 1948, Serial No. 56,279

2 Claims. (Cl. 90—59)

The present invention relates to new and useful improvements in attachments for lathes and more particularly to a work clamping attachment for clamping a shaft or the like in either a vertical or horizontal position directly to the compound rest of the lathe.

An important object of the invention is to provide a work holding attachment for lathes by means of which the work will be held in a desired position for machining the work to a desired shape by the lathe cutter, or for cutting all types of keyways, flats, squares, splines, flutes, or performing other types of work on a shaft or the like.

A further object of the invention is to provide a work holding attachment for lathes of simple and practical construction, which may be easily and quickly secured in position on the compound rest of a lathe without necessitating any changes or alterations in the construction thereof and which at the same time is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
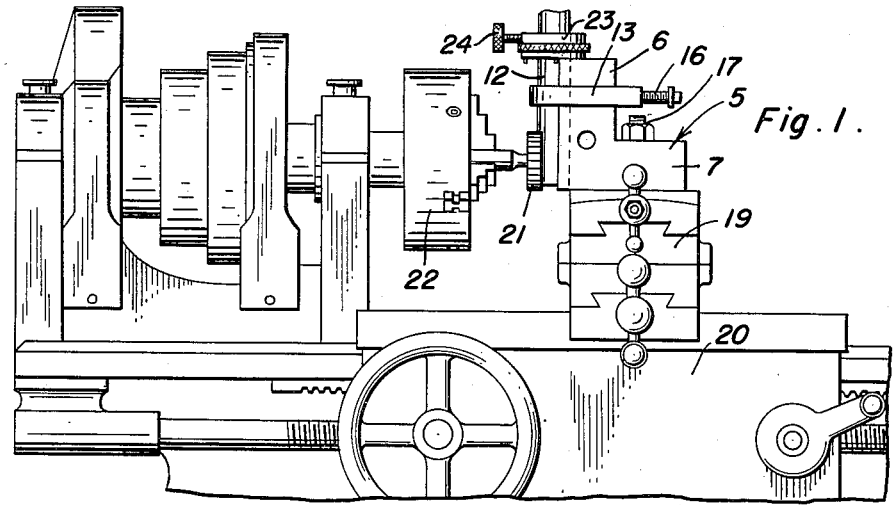
Figure 1 is a side elevational view of a lathe showing the attachment holding a shaft in a vertical position while cutting a square end on the shaft.
Figure 2:
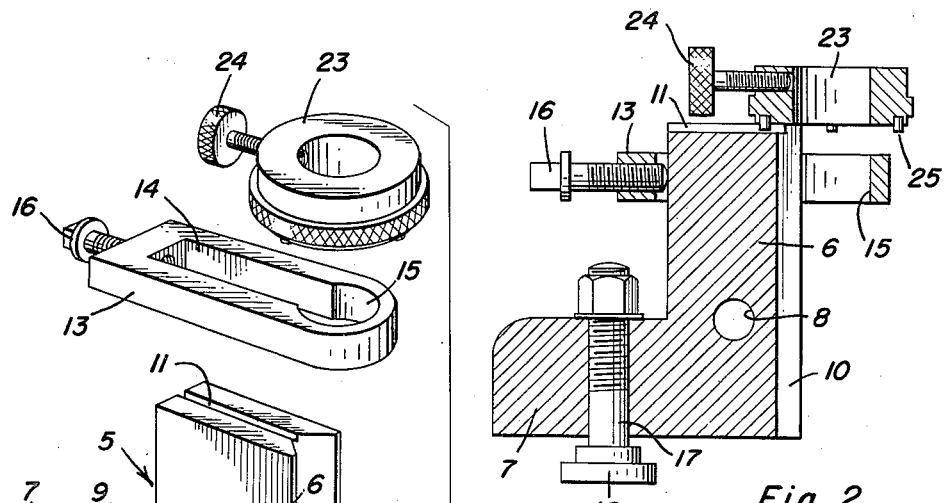
Figure 2 is a vertical sectional view of the work holding attachment showing an index head in use therewith.
Figure 3:
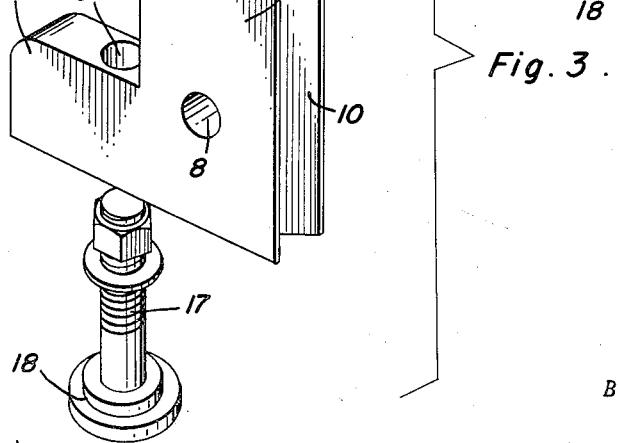
Figure 3 is a group perspective view of the work holding attachment.

Referring now to the drawings in detail wherein for the purpose of illustration I have disclosed a preferred embodiment of the invention the numeral 5 designates a substantially L-shaped work holder to provide a vertical arm 6 and a horizontal arm 7.

The lower portion of vertical arm 6 is formed with a transverse opening 8 and the horizontal arm 7 is formed with a vertical opening 9.

The outer vertical edge of vertical arm 6 is formed with a V-shaped work engaging seat 10 and the upper end of vertical arm 6 is formed with a groove 11 which extends from the rear to the front edge of the vertical arm.

When the attachment is used for cutting a square end on a shaft 12, the shaft is held in the seat 10 by an elongated endless clamp 13 having an opening 14 formed therein conforming to the cross sectional shape of the arm 6 and communicating with an enlarged circular opening 15 at one end of the clamp which embraces the shaft. A clamping screw 16 is threaded in the opposite end of the clamp 13 to hold the clamp tightly against the rear edge of the vertical arm 6.

A bolt 17 is inserted through the opening 9 of horizontal arm 7, the bolt having a head 18 at its lower end engaged in the usual T slot (not shown) in the top of a compound rest 19 of a lathe bed 20. The lower end of shaft 12 is then fed to the usual cutter 21 secured in the chuck 22 of the lathe for cutting a flat or square at the lower end of the shaft.

A conventional type of index head 23 is secured to the shaft 12 by means of a set screw 24 and is provided with pins at its bottom for engagement in groove 11 at the top of the vertical arm 6.

After one flat has been cut in the lower end of shaft 12, the clamp 13 is loosened and the index head 23 and shaft 12 are turned 90 degrees and again locked in position by one of the pins 25 on the index head and the clamp 13 again tightened to firmly hold the shaft to the work holder 5.

Figure 4:
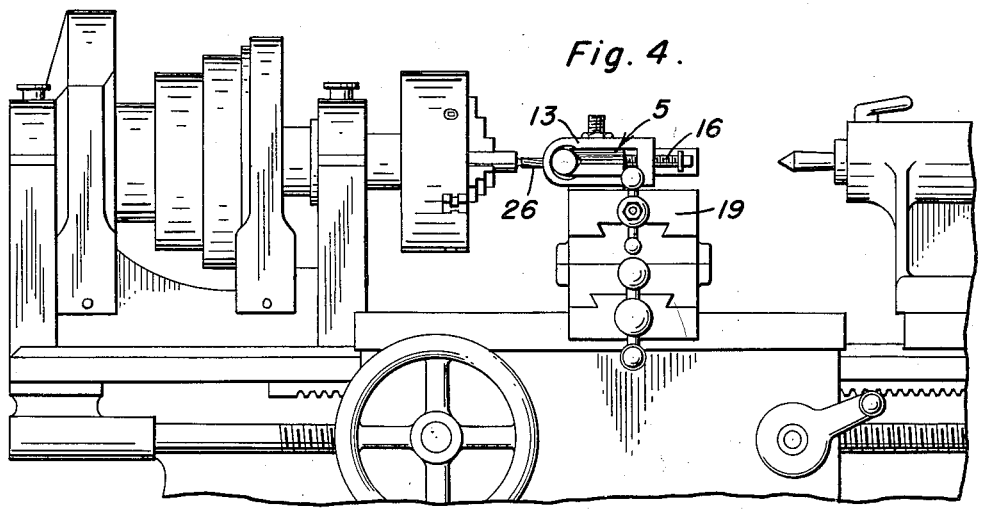
Figure 4 is a side elevational view showing a shaft held horizontally by the work holder for use with a milling cutter.

When it is desired to support the shaft in a horizontal position as shown in Figure 4 of the drawings for using a milling cutter 26, the work holder 5 is placed on its side and bolt 17 inserted in opening 8 to lock the work holder to the compound rest.

Figure 5:
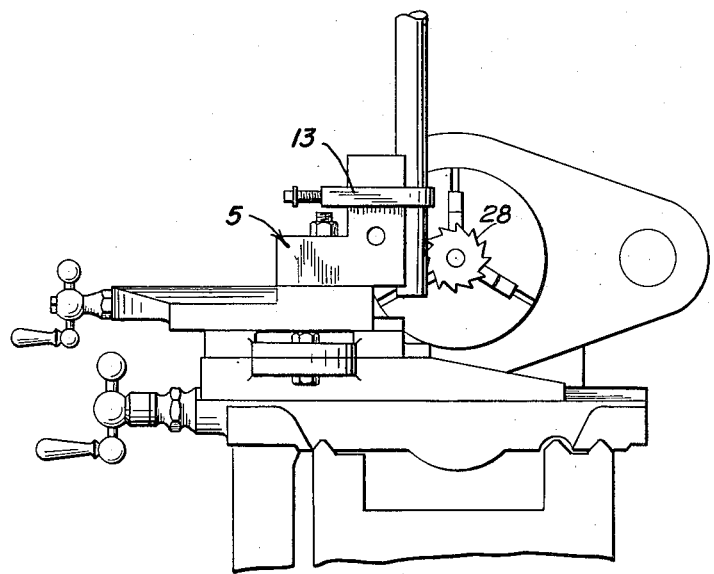
Figure 5 is a transverse sectional view of a lathe showing a shaft held in a vertical position by the work holder for cutting a keyway therein.

In Figure 5 the work holder 5 is shown locked in an upright position for holding a shaft 27 in a vertical position to cut a keyway therein by a cutter 28.

In view of the foregoing description taken in conjunction with the accompanying drawings it is believed that a clear understanding of the construction, operation and advantages of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A work holding attachment for lathes comprising a body including a horizontal arm and a vertical arm, said horizontal arm having a bolt attaching opening for attaching to the compound rest of a lathe, said vertical arm having a transverse edge groove therein, a clamp on the vertical arm for holding work against said vertical arm at a right angle to said groove, an index head fitting over the work and rotatable thereon and having pins for engagement with said groove to lock said head against rotation.

2. A work holding attachment for lathes comprising a body including a horizontal arm, and a vertical arm having a top end, said horizontal arm having a bolt attaching opening for attaching to the compound rest of a lathe, a clamp on the vertical arm for holding work against said arm to project above said end, a rotatable index head fitting on the work above said end, and interlocking devices on said head and end holding said head in differently rotated positions.

LEARD M. KEEF.

REFERENCES CITED

The following references are of record in the file of this patent:

UNITED STATES PATENTS

| Number | Name | Date |
|---|---|---|
| 1,260,271 | Kramer | Mar. 19, 1918 |
| 1,318,688 | Paschall | Oct. 14, 1919 |
| 1,705,629 | Wildbore | Mar. 19, 1929 |
| 1,994,422 | Sasek | Mar. 12, 1935 |
| 2,227,443 | Denner | Jan. 7, 1941 |
| 2,343,637 | Bochenek | Mar. 7, 1944 |

FOREIGN PATENTS

| Number | Country | Date |
|---|---|---|
| 23,912 | Denmark | Dec. 23, 1918 |